United States Patent [19]
Kawakami

[11] Patent Number: 4,751,974
[45] Date of Patent: Jun. 21, 1988

[54] APPARATUS FOR FEEDING SPROUTING BEANS OR THE LIKE IN FIXED QUANTITIES

[75] Inventor: Sanji Kawakami, Kodaira, Japan

[73] Assignee: Kabushiki Kaisha Daisei Kikai, Tokyo, Japan

[21] Appl. No.: 5,781

[22] Filed: Jan. 21, 1987

Related U.S. Application Data

[63] Continuation-in-part of Ser. No. 761,700, Aug. 2, 1985, Pat. No. 4,679,641.

[30] Foreign Application Priority Data

Aug. 16, 1984 [JP] Japan ................. 59-170930

[51] Int. Cl.⁴ .................... G01G 13/24; G01G 13/04
[52] U.S. Cl. ...................... 177/114; 177/121
[58] Field of Search ................. 177/114, 121

[56] References Cited

U.S. PATENT DOCUMENTS

| | | | |
|---|---|---|---|
| 2,597,831 | 5/1952 | Willis | 177/164 |
| 2,702,177 | 2/1955 | Jee et al. | 177/121 X |
| 2,775,425 | 12/1956 | Engvall | 177/121 X |
| 2,933,281 | 4/1960 | Hyde et al. | 177/121 |
| 3,939,929 | 2/1976 | Hidaka et al. | 177/121 |
| 4,421,185 | 12/1983 | Koto et al. | 177/121 X |

Primary Examiner—George H. Miller, Jr.
Attorney, Agent, or Firm—Oblon, Fisher, Spivak, McClelland & Maier

[57] ABSTRACT

An apparatus for feeding sprouting beans or the like which are raked-up by a conveying belt arranged standing slantwise from a lower resevoir for the sprouting beans, with a plurality of needlelike projections planted thereon, and fed into a weighing bucket so as to weigh the same in fixed quantities. The conveyor belt serves to increase the weighing accuracy in such a manner that after the sprouting beans are fed into the weighing bucket in a predetermined desired quantity, the raking-up speed is lowered and, as a result, the sprouting beans are conveyed little by little until such reach a given quantity.

4 Claims, 3 Drawing Sheets

APPARATUS FOR FEEDING SPROUTING BEANS OR THE LIKE IN FIXED QUANTITIES

This is continuation-in-part application of U.S. patent application Ser. No. 06/761,700 filed Aug. 2, 1985, now U.S. Pat. No. 4,679,641.

BACKGROUND OF THE INVENTION

1. Field of the Invention

This invention is intended to provide an apparatus for feeding sprouting beans or finely cut vegetables divided in fixed quantities. In this apparatus, sprouting beans or the like are raked up by a conveying belt arranged standingly slantwise from a lower reservoir for the sprouting beans, with a number of needlelike projections planted thereon, and fed into a weighing bucket so as to weigh them in fixed quantities. This conveying belt serves to increase the weighing accuracy in such a manner that after the sprouting beans are fed into the weighing bucket in a predetermined desired quantity prefixed, the raking-up speed is reduced, and as a result the sprouting beans are conveyed out little by little until they reach a given quantity.

2. Discussion of Background

This invention relates to an apparatus for feeding sprouting beans or finely cut vegetables (which will be generally called "sprouting beans" hereinafter in this invention) divided in fixed quantities, for the purpose of packing them into bags in fixed quantities or the like purposes.

Such an apparatus is already known in which sprouting beans are continuously carried into a weighing bucket for weighing a given weight of them by a transporting conveyor, and being discharged therefrom when the sprouting beans in the weighing bucket reach the given weight, but it is difficult to take out the sprouting beans divided in fixed quantities with accuracy, because the usual transporting conveyor cannot always supply the sprouting beans in fixed quantities and besides the sprouting beans continue to be conveyed incessantly from the transporting conveyor to the weighing bucket.

SUMMARY OF THE INVENTION

In this invention, there is adopted a unique conveying means in which sprouting beans are raked up by a conveying belt arranged standing slantwise from a lower reservoir for the sprouting beans, with a number of needlelike projections planted thereon, and fed into an upper weighing bucket, and the adopted conveying means serves to heighten the weighing accuracy for the sprouting beans taken out of the weighing bucket, which are to be weighed through the conveying procedure comprising lowering the conveying speed of the raking-up conveyor when the sprouting beans are fed into the weighing bucket in a primary given quantity prefixed, and then conveying the sprouting beans in small quantities into the weighing bucket till they reach a secondary given quantity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The invention will now be described with reference to the illustrated embodiments.

Figure 1:
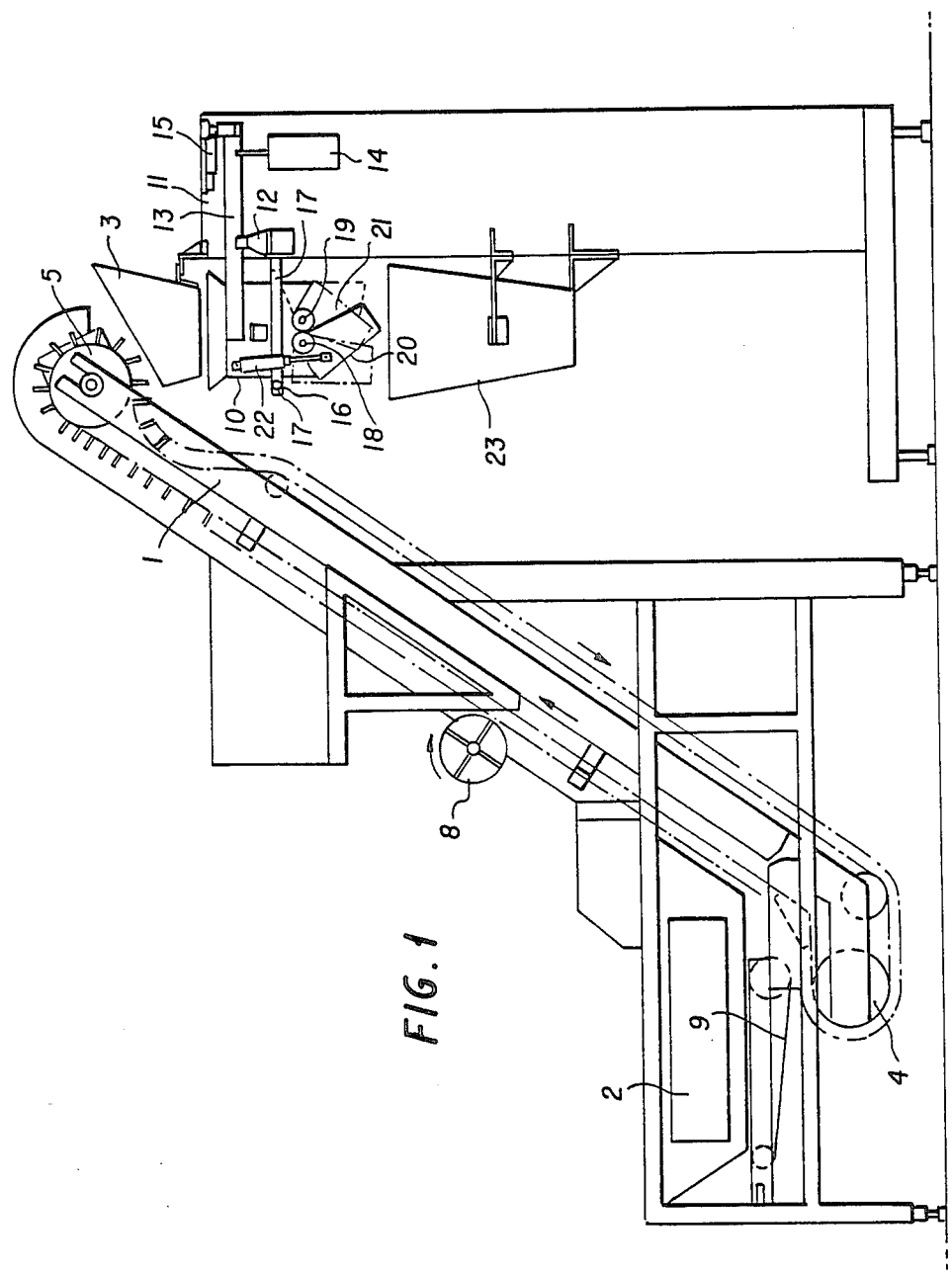
FIG. 1 is a side view showing one embodiment according to the invention.

In FIG. 1, the reference numeral 1 represents a raking-up conveyor arranged standingly slantwise from a lower reservoir 2 for receiving sprouting beans to be supplied in fixed quantities to the upper part of a hopper 3 mentioned below, which conveys the sprouting beans in the reservoir 2 into the hopper 3.

Figure 2:
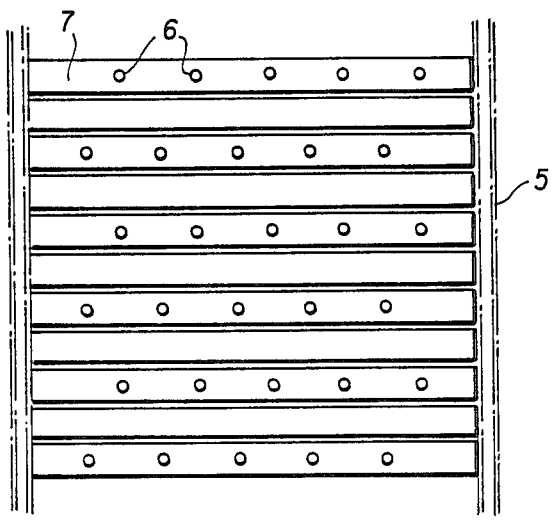
FIG. 2 is a plane view of a raking-up conveyor in part.
Figure 3:
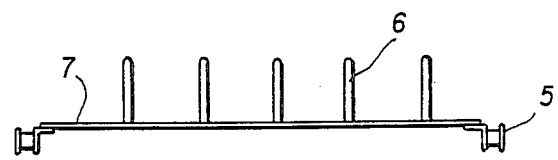
FIG. 3 is a side view of FIG. 2.

As shown in FIG. 2 and FIG. 3, the raking-up conveyor 1 comprises a conveying belt made up of two chains 5 stretched over between a pair of lower sprockets 4 and a pair of upper sprockets and a number of conveyor plates 7 fixed to the chains 5 so as to lay sideways over them, with a number of needlelike projections 6 planted thereon as shown in FIG. 2.

The needlelike projections 6, which are suitably used in the raking-up of usual sprouting beans, are 20–80 mm, preferably 40–50 mm in length and 30–80 mm, and preferably with 40–60 mm intervals between each other.

The reference numeral 8 represents a rotary levelling means made up of combs combined crosswise, which is used to level the upper surface of the sprouting beans to be raked up by the raking-up conveyor. In addition, the needlelike projections 6 may be formed by making notches on the conveyor plates 7 and folding the notched parts so that they become erect.

A weighing bucket 10 is placed under the hopper 3. The weighing bucket 10 is fitted to the left end of an arm 13 supported at a fulcrum of a knife edge provided on a bracket 12 fixed to a framework 11, and a balance weight 14 is fixed to the right end of the arm 13.

The right end of the arm 13 is connected with a load cell 15 for detecting the weight of the sprouting beans fed in the weighing bucket 10.

The weighing bucket 10 is received by rollers 17 supported on an arm 16 fixed to the framework 11 so as not to be pivoted from side to side, without giving any resistance to this weighing.

A discharging mechanism comprises bottom plates 20, 21 which can be opened and shut in mutual linkage by means of gears 18, 19 engaging with each other and a piston 22 fixed between the bottom plate 20 and the weighing bucket 10 so as to open and shut the bottom plates 20 and 21, and this discharging mechanism is provided at the bottom of the weighing bucket 10.

Reference numeral 23 represents a hopper which receives the sprouting beans discharged from the weighing bucket 10 in fixed quantities, and packs them into bags or does similar work, when desired.

Although not illustrated, the driving of the raking-up conveyor 1 is carried out by two types of driving mechanisms so that two types of driving force, that is, high speed and low speed, can be transmitted thereto from a motor. By selecting one of the two types of driving mechanisms by an electromagnetic clutch, the conveyance of the sprouting beans can be carried out at either high speed or low speed.

A variable motor may be also used as the driving motor for the raking-up conveyor so that the conveying speed of the raking-up conveyor can be changed by directly altering the speed of the driving motor stepwise.

The piston 22 for opening and shutting the bottom plates 20, 21, which constitute the discharging mechanism for the weighing bucket 10, is so made as to be actuated to discharge the sprouting beans in the weighing bucket 10, when the weight of the sprouting beans detected by the load cell 15 reaches a given value.

The operation of the apparatus explained above will be described here.

First, the raking-up conveyor 1 is driven at high speed so as to feed the sprouting beans to be supplied in fixed quantities into the weighing bucket 10 rapidly. The raking-up conveyor 1 catches the sprouting beans with the needlelike projections 6, and conveys them in the state of being compressed to a constant density with a given thickness from the reservoir 2 to the hopper 3.

When the sprouting beans in the weighing bucket 10 increase in quantity and the weight given to the load cell 15 by way of the arm 13 reaches the prefixed primary value, the driving system of the raking-up conveyor 1 is switched to low speed in response to the signals from the load cell 15. Accordingly, after the primary fixed value is achieved, such will be fed into the weighing bucket 10 little by little.

When the load cell 15 detects the prefixed secondary given weight, the piston 22 is actuated in response to the detection signals so that the bottom plates 20, 21 are opened as shown by the phantom in FIG. 1, to discharge the sprouting beans in the weighing bucket 10.

After a given period of time, the piston 22 is returned to its initial position by a timer to shut the bottom plates 20, 21 and at the same time return the driving speed of the raking-up conveyor 1 to the initial high speed.

Thus, the sprouting beans can be fed in fixed quantities with weighing accuracy, by feeding them at high speed till a little before their weight reaches a given weight at that they are to be taken out, and then feeding them in small amounts till their weight reaches said given weight.

Figure 4:
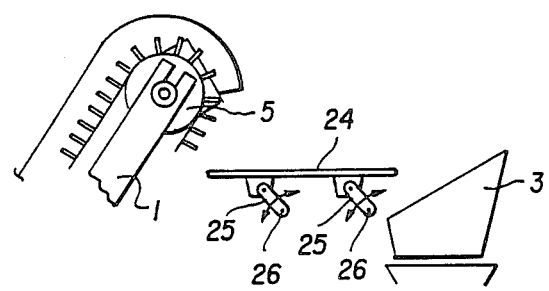
FIG. 4 is a side view showing the upper end part of another raking-up conveyor.

In the embodiment illustrated above, there is shown an apparatus having a structure in which the sprouting beans raked up by the raking-up conveyor 1 are thrown directly into the hopper 3. As shown in FIG. 4, the apparatus may be composed so as to have a structure in which the sprouting beans raised up by the raking-up conveyor 1 are dropped on a vibrating plate 24 once and disentangled by the vibration given by the vibrating plate 24, and then thrown into the hopper 3.

Figure 5:
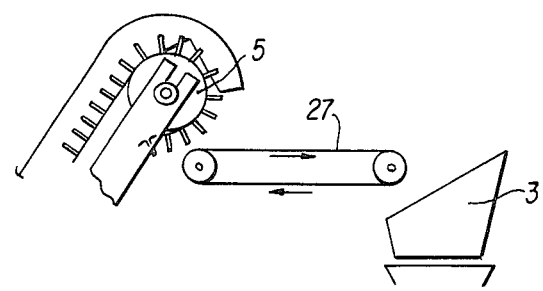
FIG. 5 is a side view showing a conveyor belt.

The vibrating plate 24 is supported by links 25 which are oscillated around a pivotal point 26 as shown by the arrow, and vibrated by the links, whereby the sprouting beans intertwined in lumps can be untangled by vibration and transferred to the hopper 3. FIG. 5 illustrates a conveying belt located downstream of the raking-up conveyor wherein the conveying belt is driven faster than the raking-up conveyor and receives the sprouting beans raised up by the raking-up conveyor. Accordingly, the sprouting beans are transferred to the weighing bucket by the conveying belt. The bean sprouts raised by the raking-up conveyor 1 are dropped on to the conveying belt 27 and as a result, are untangled and scattered into the hopper 3. Accordingly, the bean sprouts are fed uniformly into the weighing bucket so as to thereby assure that accurate weighing is accomplished.

According to this invention, as has been described above, conveying belt arranged standingly slantwise, with a number of needlelike projections planted thereon, is adopted to convey the sprouting beans to a weighing bucket. Accordingly, this invention enables the sprouting beans to be conveyed with accuracy, because a fixed quantity of the sprouting beans can be caught by the needlelike projections and raked up in the state of being compressed to a constant density with a given thickness, and they are not conveyed directly in the form of lumps.

According to this invention, the time at which the sprouting beans have been thrown into the weighing bucket in a fixed quantity can be detected accurately, and the amount of the sprouting beans which continue to be thrown into the weighing bucket for a period of time from this time to the time at which the discharging mechanism is opened can be fixed. Thus, the taking-out of th sprouting beans in fixed quantities with accuracy can be effected by setting the weight point of the weighing bucket which produces an operative signal to the discharging mechanism, with good timing.

In this invention, furthermore, the sprouting beans are conveyed to the weighing bucket at high speed until the load cell detects the prefixed primary weight, and the speed of the raking-up conveyor is lowered to feed the same in small amounts after the primary fixed weight is detected. Thus, the time at which the weight of the sprouting beans to be taken out reaches a fixed value can be known accurately, and as a result, the feed of the sprouting beans in fixed quantities can be effected with accuracy.

Especially, this invention can heighten effectively the accuracy in the feed of sprouting beans in fixed quantities, which has been difficult in conventional methods, by use of a simple mechanism in which the conveying speed of raking-up conveyor is merely changed while the feed of the sprouting beans by the raking-up conveyor is continuously carried out.

What is claimed as new and desired to be secured by Letters Patent of the United States is:

1. An apparatus for feeding sprouting beans or the like in fixed quantities, which comprises:
   a framework having a first arm extending therefrom and a second arm extending therefrom and having a plurality of rollers mounted thereon;
   a weighing bucket having a discharging mechanism at the bottom, said weighing bucket being received by said rollers of said second arm so as not to be pivoted from side to side;
   a load cell connected to said first arm for detecting the weight of said weighing bucket;
   a raking-up conveyor comprising a conveying belt arranged standing slantwise from a lower sprouting beans reservoir to said weighing bucket, with a plurality of needlelike projections extending therefrom, which conveys continuously the sprouting beans from said reservoir to said weighing bucket while holding the sprouting beans by means of said needlelike projections;
   conveyor control means for decreasing the conveying speed of said raking-up conveyor when said load cell detects a predetermined primary weight of the weighing bucket;

means for intermittently actuating the discharging mechanism of said weighing bucket to discharge the sprouting beans in its interior when said load cell detects a predetermined secondary weight of said weighing bucket; and conveying means disposed adjacent said end portion of said raking-up conveyor for receiving sprouting beans raised up by said raking-up conveyor and for transferring said sprouting beans to said weighing bucket.

2. An apparatus, as set forth in claim 1, wherein said conveyor belt comprises a plurality of chains over which a plurality of conveyor plates with said plurality of needlelike projections planted thereon are laid crosswise.

3. An apparatus, as set forth in claim 1, further comprising timer means wherein after the discharging mechanism of said weighing bucket is actuated so as to dicharge the sprouting beans in said bucket, the discharging mechanism is closed by said timer means.

4. An apparatus as set forth in claim 1, further comprising a vibration plate for receiving the sprouting beans raised up by said raking-up conveyor, wherein the sprouting beans are transferred to said weighing bucket by said vibration plate.

* * * * *